United States Patent Office 3,141,182
Patented July 21, 1964

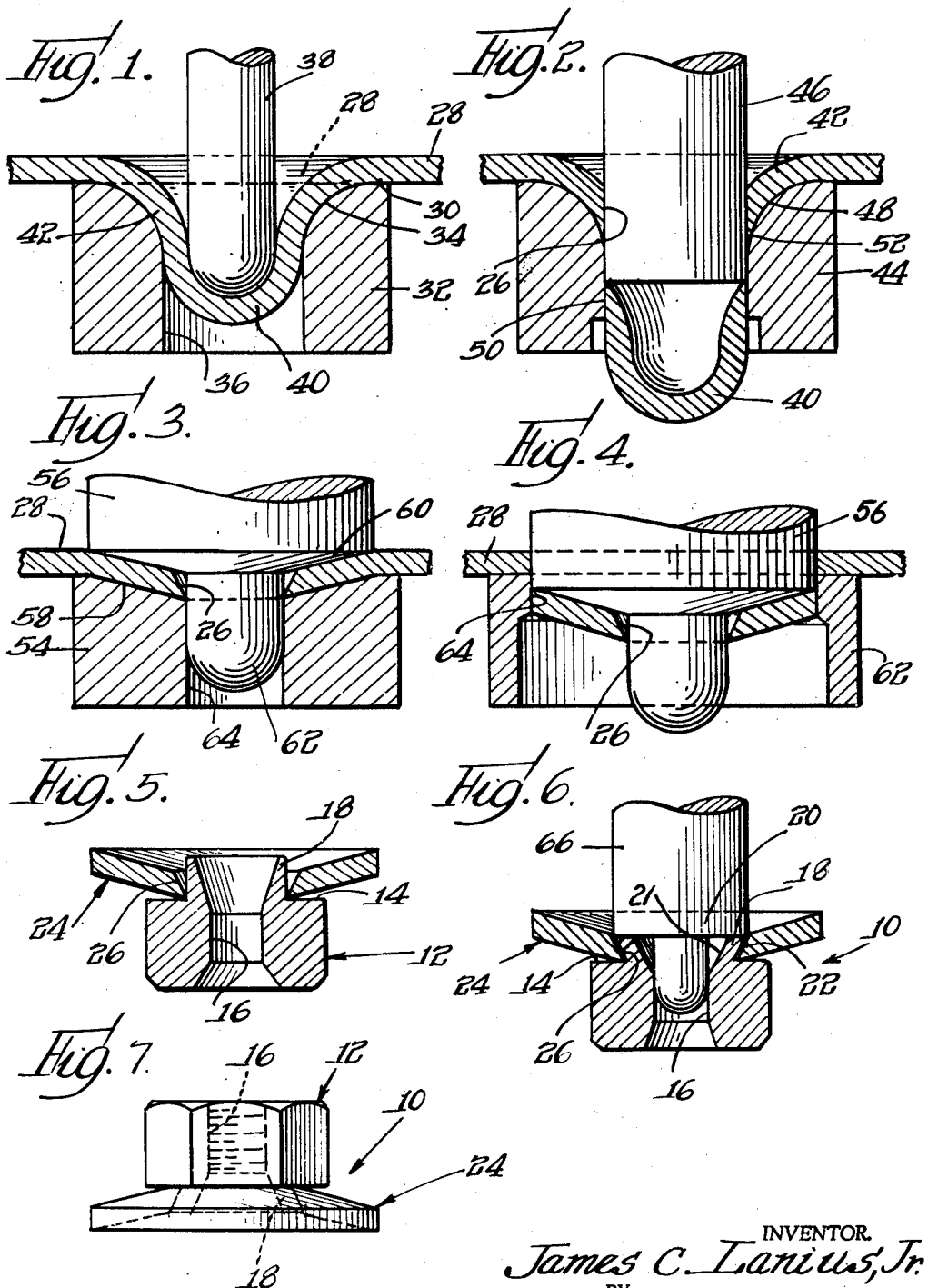

3,141,182
METHOD OF FORMING AND ASSEMBLING
WASHER AND FASTENER UNIT
James C. Lanius, Jr., Chicago, Ill., assignor to Illinois
Tool Works Inc., Chicago, Ill., a corporation of
Delaware
Filed Sept. 7, 1962, Ser. No. 222,110
3 Claims. (Cl. 10—86)

This invention relates to fastening devices, and more specifically to novel pre-assembled fastener units including a washer and a nut or screw member and a method of producing them.

As will be understood, pre-assembled fastener units of a type contemplated herein include an annular washer positioned adjacent a clamping surface of a nut member or screw head and having an inner annular margin surrounding a screw shank or an annular depending element on a nut member. It has been found that, for certain fastener units, problems have been encountered when attempting to provide a structure for facilitating assembly of the washer with a fastener and for enabling the washer to rotate relatively freely with respect to the fastener.

An important object of the present invention is to provide a novel method of producing pre-assembled fastener units of the above described type and, more specifically, to provide a novel method of forming washers having central apertures defined by a tapering or frusto-conical wall.

A further object of the present invention is to provide a novel method of forming washers of the above described type rapidly and economically.

Still another object of the present invention is to provide a novel pre-assembled fastener unit of the above described type wherein a washer and nut member are interconnected in a manner so as to be effectively retained in pre-assembled relationship without interfering with the function of the washer.

Other objects and advantages of the present invention will become apparent from the following descriptions and the accompanying drawing wherein:

FIG. 1 is a partial sectional view showing an initial step in the method of forming a washer in accordance with features of the present invention;

FIGS. 2, 3 and 4 are partial sectional views showing successive steps in the formation of the washer in accordance with the present invention;

FIG. 5 is a sectional view showing a pre-assembled fastener unit in a partially assembly condition;

FIG. 6 is a partial sectional view showing a further step and the process of producing a fastener unit in accordance with the present invention; and FIG. 7 is an elevational view showing a pre-assembled fastener unit constructed in accordance with the present invention.

Referring now more specifically to the drawing wherein like parts are designated by the same numerals throughout the various figures, a fastener unit 10 incorporating features of the present invention is shown in FIGS. 6 and 7. The unit 10 comprises a nut member 12 having a radially extending clamping face 14 and an internally threaded central aperture 16. An annular skirt-like element 18 projects from the clamping face 14 around the central aperture.

As shown best in FIG. 6, the skirt-like element 18 flares outwardly so as to provide the central aperture with an enlarged mouth 21. In addition, the skirt-like element 18 presents a flaring outer surface 22.

The fastener unit 10 includes a washer 24 formed from sheet material and having a central aperture defined by a tapering inner marginal surface or wall 26. The tapering or frusto-conical wall 26 surrounds the skirt element 18 of the nut member and has an included angle substantially the same as the included angle of the frusto-conical surface 22 of the skirt element. However, the diameter of the surface 26 is slightly greater than the diameter of the surface 22 so that there is sufficient clearance between the surfaces for enabling the washer and nut to rotate freely relative to each other. The surface 22 underlies the surface 26 for retaining the w sher in pre-assembled relationship with the nut member. It is to be noted that the axial extent of the skirt element 18 is not greater than and is preferably slightly less than the thickness of the washer stock material so that when the fastener unit is fully tightened against a workpiece, the skirt element will avoid material engagement with the workpiece and will not interfere with the proper function of the washer.

In accordance with a feature of the present invention, the washer is formed and the fastener unit is assembled in accordance with the process shown in FIGS. 1–6. More specifically, a flat piece of stock material 28 is first supported around an annular area 30 thereof on an upper end of a die member or element 32. The die member includes an annular surface 34 having a rounded and convex cross-sectional configuration and merging with the wall of a central aperture 36. The unsupported central area of the stock material 28 is then engaged by a plunger 38 having a rounded tip portion and a diameter less than the diameter of the aperture 36. The stock material is drawn by the plunger 38 so as to form a central rounded cup portion or section 40 surrounded by and merging with an annular portion or section 42. The annular portion 42 is drawn so as to conform to the surface 34 of the die element, or, in other words, the annular portion 42 is formed so that diametrically opposite portions thereof have concavo-convex cross sections.

It is contemplated that the stock material 28 may be in the form of a continuous strip which may be intermittently advanced to successive work stations. After the cup-shaped and annular portions 40 and 42 of the stock material have been drawn and formed by the die element 32 and plunger 38 at a first work station, they are advanced to a second work station shown in FIG. 2. Another die 44 and a cooperable punch 46 are located at the second work station. The die 44 has an annular surface 48 similar to the surface 34 of the die element 32 and a central aperture 50. The punch 46 has a diameter similar to the diameter of the aperture 50 so that it is adapted to punch the cup-shaped central portion 40 from the remainder of the stock material for initially providing the inner marginal wall 26 of a washer. The wall 26 has a cylindrical configuration and an axial extent substantially larger than the thickness of the stock material. The lower end portion of the cylindrical wall 26 merges with the lower flaring surface of the annular portion 42 in a relatively thin elongated margin 52.

After the cup-shaped element 40 has been stamped from the stock material as shown in FIG. 2, the partially formed washer is advanced to a third work station shown in FIG. 3 at which cooperable dies 54 and 56 are located. These dies have complementary frusto-conical annular surfaces 58 and 60 which could be substantially flat, if desired, and respectively engageable with the annular portion 42 of the stock material. In addition, the die member 56 carries a central pin 62 adapted to extend through the opening in the washer blank and into an aperture 64 in the die member 54. It is to be noted that the included angle of the frusto-conical die surfaces 58 and 60 is substantially greater than the included angle of projections of the inner margin of the annular portion 42. As a result, the die members 54 and 56 are adapted to reform and axially collapse the annular portion 42 and the thin inner marginal edge 52 thereof. This action not only flattens the washer body but causes the diameter of a central aperture to be reduced to its final dimension and also causes the inner marginal wall 26 to be partially axially collapsed and formed to provide the above described frusto-conical configuration.

The partially formed washer is advanced from the work station of FIG. 3 to a fourth work station at which cooperable punch and die members 60 and 62, shown in FIG. 4, are located. The punch 60 corresponds substantially in size and shape to the die element 56 while the die member 62 has a relatively large central aperture 64 for accommodating the punch 60 whereby the punch is adapted to stamp the washer 24 from the remainder of the stock material 28.

The formed washer is then assembled over a partially formed skirt element 18 of a nut blank as shown in FIG. 5. It is to be noted, that the partially formed skirt element 18 initially has a substantially cylindrical outer surface of uniform diameter throughout its length for enabling the skirt element to pass through the central aperture in the washer. In addition, the skirt element initially has an axial length considerably greater than the thickness of the washer stock material so that the skirt element projects beyond the opposite side of the washer as shown in FIG. 5. However, the inner surface of the skirt 18 is initially flared in the manner previously described so that the skirt is of progressively decreasing wall thickness toward its outer or free end.

After the washer and nut blank have been assembled as shown in FIG. 5, the outer or free end of the skirt element 18 is engaged by a punch or die member 66 as shown in FIG. 6 and swaged axially inwardly. This action causes the skirt element to be reformed so as to provide it with a generally uniform wall thickness throughout its length and so as to cause its outer surface 22 to flare outwardly as described hereinabove.

While the preferred embodiment of the present invention has been shown and described herein, it is obvious that many details may be changed without departing from the spirit and scope of the appended claims.

The invention is claimed as follows:

1. A method of making a pre-assembled fastener unit comprising providing a nut member having a clamping face and an annular skirt projecting from said clamping face and having a substantially cylindrical outer surface and an outwardly flaring inner surface, providing a piece of sheet material stock of predetermined thickness for a washer and supporting said piece of sheet material stock along an annular area thereof and leaving a portion of the sheet material stock within said area unsupported, then drawing and forming said portion of the sheet material stock and thereby providing a central cup-shaped section surrounded by an annular section substantially inclined away from the remainder of the sheet material stock, then supporting said annular section and punching said cup-shaped section from said stock material and thereby providing an aperture having a substantially cylindrical wall of uniform diameter defining an inner margin of said annular section and having an axial extent greater than the thickness of said sheet material stock, subsequently at least partially flattening said annular section and simultaneously forming said wall into a substantially frusto-conical configuration, punching said annular section from the remainder of the stock material to provide a washer, then assembling said washer over said skirt element of the nut member, and swaging an outer end of said skirt element for axially collapsing the skirt element and forming said outer surface of the skirt element for engaging beneath said frusto-conical wall of the washer.

2. In a method of making a washer the steps comprising drawing and forming an intermediate portion of a piece of substantially flat sheet material stock having a predetermined thickness and thereby providing a central cup-shaped section surrounded by an annular section having a radial extent substantially greater than said thickness and inclined from the remainder of the sheet material stock, then punching a central portion of said cup-shaped section from said sheet material stock to form an aperture having a generally cylindrical wall of substantially uniform diameter throughout its length defining an inner margin of said annular section and having an axial extent greater than the thickness of the sheet material stock, subsequently at least partially flattening said annular section and axially collapsing and forming said wall and thereby providing said wall with a substantially frusto-conical configuration and separating said annular section from the remainder of said stock material.

3. In a method of making a washer of the type described, the steps comprising supporting a piece of substantially flat sheet material stock having a predetermined thickness along an annular area thereof and leaving a portion of said stock within said area unsupported, then drawing and forming said portion and thereby providing a central cup-shaped section surrounded by an annular section having a radial extent substantially greater than said thickness and inclined from the remainder of the sheet material stock, then supporting said annular section and punching said cup-shaped section therefrom and thereby forming an aperture having a predetermined diameter and a generally cylindrical wall defining an inner margin of said annular section, said wall having an axial extent greater than the thickness of the sheet material stock, subsequently at least partially flattening said annular section and upsetting said cylindrical wall and progressively reducing the diameter of said cylindrical wall from adjacent one end thereof toward an opposite end thereof and thereby providing said wall with a substantially frusto-conical configuration, and separating said annular section from the remainder of said sheet material stock.

References Cited in the file of this patent
UNITED STATES PATENTS

| | | |
|---|---|---|
| 2,051,639 | Kaimbacker | Aug. 18, 1936 |
| 2,352,265 | Kapple et al. | June 27, 1944 |
| 2,619,146 | Poupitch | Nov. 25, 1952 |
| 2,703,418 | Poupitch | Mar. 8, 1955 |
| 2,779,375 | O'Connor | Jan. 29, 1957 |
| 3,037,221 | Lanius | June 5, 1962 |